United States Patent [19]

Sato et al.

[11] 3,997,889
[45] Dec. 14, 1976

[54] ALARM SYSTEM FOR INDICATING A FAULT CONDITION OF AN ANTI-SKID BRAKING CONTROL SYSTEM

[75] Inventors: Takefumi Sato; Tatuo Yokoyama, both of Tenri, Japan

[73] Assignee: Sharp Kabushiki Kaisha, Osaka, Japan

[22] Filed: Jan. 29, 1975

[21] Appl. No.: 545,209

[30] Foreign Application Priority Data

Jan. 30, 1974 Japan .................... 49-13170
Jan. 30, 1974 Japan .................... 49-13169

[52] U.S. Cl. .................... 340/256; 303/92; 340/52 B
[51] Int. Cl.² .................... G08B 21/00; B60T 17/22
[58] Field of Search ......... 340/256, 253, 248, 52 B; 188/181; 303/21 AF

[56] References Cited

UNITED STATES PATENTS

| | | | |
|---|---|---|---|
| 2,566,597 | 9/1951 | Cass | 340/253 C |
| 3,014,207 | 12/1961 | Principale | 340/256 X |

*Primary Examiner*—John W. Caldwell
*Assistant Examiner*—Daniel Myer
*Attorney, Agent, or Firm*—Stewart and Kolasch, Ltd.

[57] ABSTRACT

In an alarm system wherein a fault detection unit and a fault indication unit are spaced away from each other, long wires for detection signal transmission and for power supply, etc., are necessary. A fault indication driving circuit is provided within or adjacent to the fault indication unit, the bias voltage of the fault indication driving circuit being determined with the use of the detection signal transmission wire and the power supply wire in such a manner that the fault indication is enabled when one of the long wires is accidentally broken or placed in poor connection condition.

7 Claims, 4 Drawing Figures

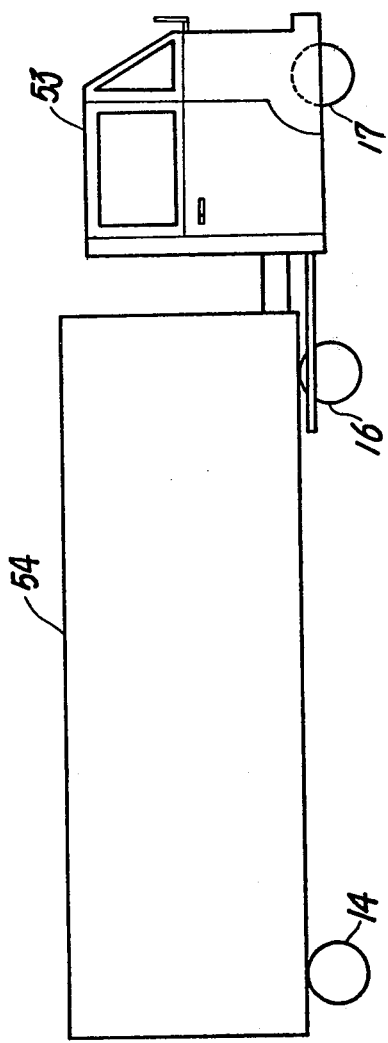
FIG. IA
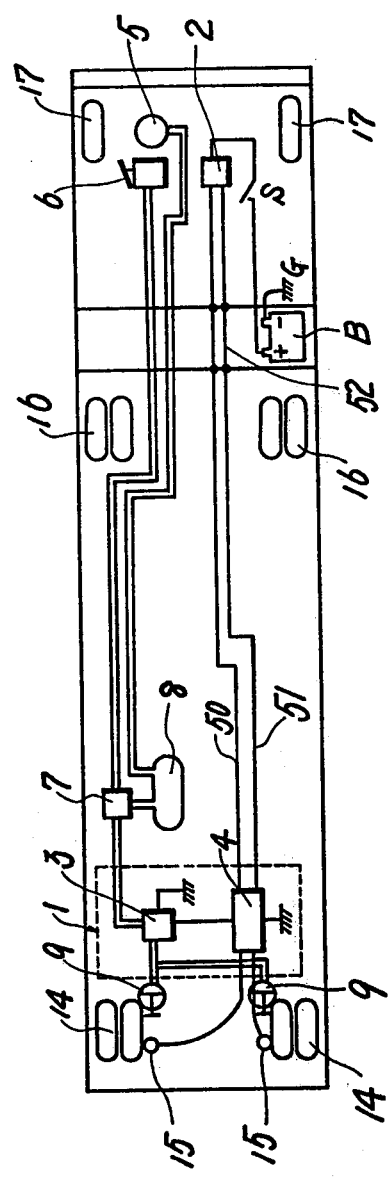
FIG. IB

ALARM SYSTEM FOR INDICATING A FAULT CONDITION OF AN ANTI-SKID BRAKING CONTROL SYSTEM

BACKGROUND OF THE INVENTION

The present invention relates to an alarm system wherein a fault detection unit and a fault indication unit are spaced away from each other, and more particularly relates to an alarm system of a skid control system provided within a truck or a trailer.

Many approaches have been proposed for indicating a fault condition of a skid control system. The prior art alarm system only indicates a burn-out or a short-circuit within a wheel revolution sensor, a trouble occurring within a control circuit, a fault of a brake pressure control mechanism, etc.

A detection signal transmission wire and a power supply wire are considerably long when the skid control system is adapted to a truck or a trailer, since a fault indication unit is provided in a driver's cab whereas a fault detection unit and the control circuit are provided adjacent to rear wheels. The alarm system of the prior art does not take care of breaking of wires such as the detection signal transmission wire and the power supply wire which connect the fault indication unit with the fault detection unit and the control circuit. It is also necessary to detect and indicate failure of a connector which is usually disposed between the fault indication unit and the fault detection unit.

OBJECTS AND SUMMARY OF THE INVENTION

Accordingly, an object of the present invention is to provide a fault indication driving circuit suited for an alarm system wherein a fault detection unit and a control circuit are spaced away from a fault indication unit.

Another object of the present invention is to provide an alarm system which can indicate not only a fault condition of a control circuit but also accidental disconnection of a detection signal transmission wire and/or a power supply wire which connect the fault indication unit with the fault detection unit and the control circuit.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to the present invention, a fault indication driving circuit is provided within or adjacent to a fault indication unit including, for example, an alarm lamp or an alarm bell. A fault detection unit and a control circuit are connected with the fault indication driving circuit with the use of long wires such as a detection signal transmission wire and a power supply wire. The bias voltage of the fault indication driving circuit is determined with the use of the detection signal transmission wire and the power supply wire, whereby the fault indication unit including the alarm lamp or the alarm bell is activated when one of the long wires is disconnected in error.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1A is a schematic diagram of a standard tractor and trailer;

FIG. 1B is a schematic diagram showing a tractor and trailer employing a skid control system and an alarm system of the present invention;

DESCRIPTION OF THE PREFERRED EMBODIMENTS

Figure 2:
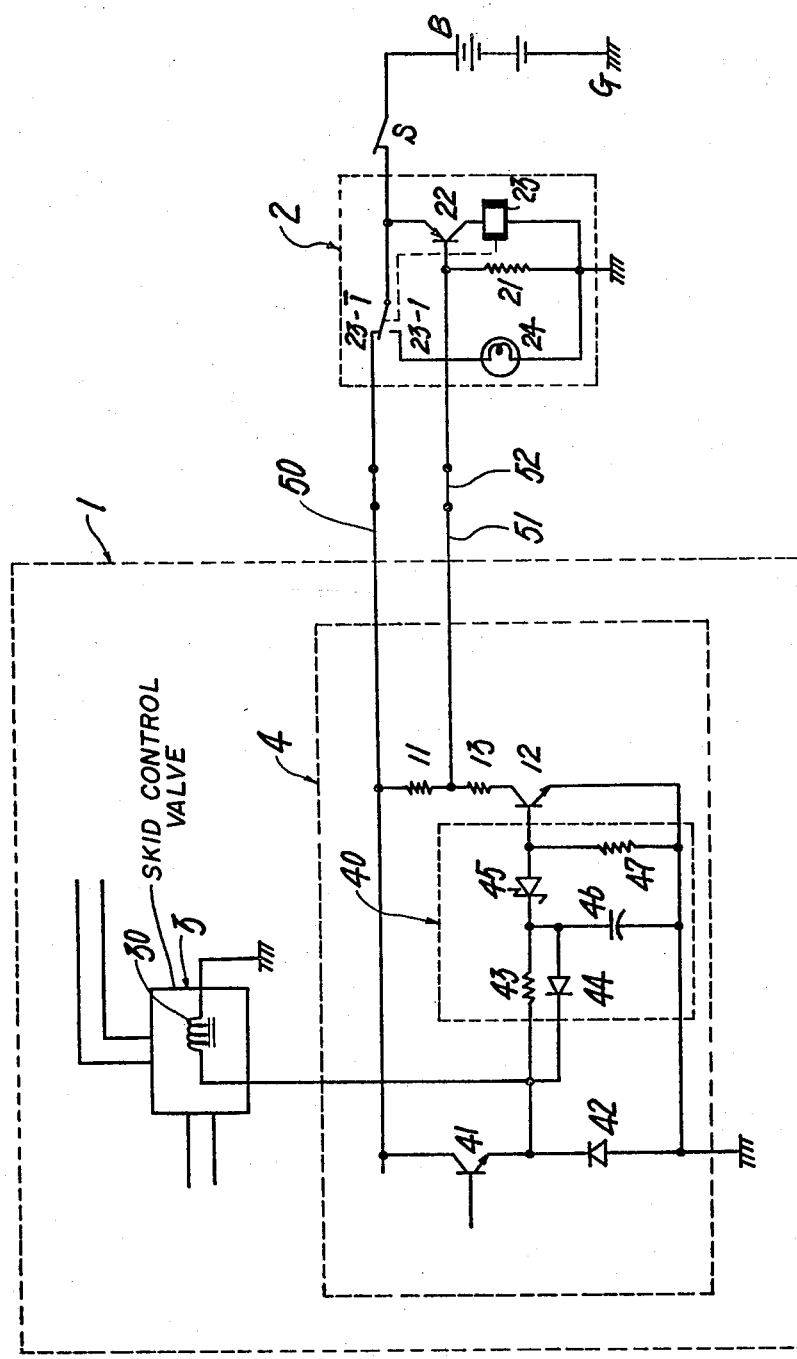
FIG. 2 is a circuit diagram showing an embodiment of the present invention.

Referring now in detail to the drawings, and to facilitate a more complete understanding of the present invention, a tractor and trailer including a skid control system employing an alarm system of the present invention will be first described with reference to FIG. 1.

A skid control system 1 is provided to control a brake pressure applied to wheels 16, 17 of a tractor 53 and supporting wheels 14 of a trailer 54. A fault indication unit 2 is provided in a driver's cab in such a manner that a driver can recognize a fault condition of the skid control system. A brake system including an air compressor 5, an air tank 8, a relay valve 7, a skid control valve 3 and a brake chamber 9 can be of a conventional construction and actuated through a foot pedal 6. Needless to say, the brake system is connected with the wheels 14, 15, 16, but, in the drawing, the brake system is connected only to the supporting wheels 14 of a trailer 54 and the connection means between the brake system and the wheels 16, 17 of the tractor 53 have been omitted for the purpose of simplicity.

Wheel revolution sensors 15 attached to the supporting wheels 14 provide signals for a circuit 4 including a skid control circuit and a fault detection unit in order to control the brake pressure and to, if necessary, activate the fault indication unit 2. The skid control circuit activates the skid control valve 3 in order to reduce the damping pressure caused by the brake chamber 9 when the signal indicating the occurrence or the imminence of a wheel skid condition is detected by the skid control circuit.

The skid control circuit can be of any construction known in the art and since the specific details thereof do not constitute a part of the present invention they have been omitted for the purpose of simplicity.

The fault indication unit 2 is spaced away from the fault detection unit, and they are connected with each other through a power supply wire 50, a detection signal transmission wire 51 and a connector 52. The fault indication unit 2 and hence the skid control circuit and the fault detection unit are connected with a power supply source B via a switch S.

Detailed circuit construction of the fault detection unit and the fault indication unit 2 including a fault indication driving circuit of the present invention will be described with reference to FIG. 2.

The fault detection unit detects, for example, a trouble occurring within the skid control circuit as is well known in the art. A transistor 41 is provided within the skid control circuit for supplying an activating signal which is applied to a solenoid 30 in the skid control valve 3 in accordance with the determination carried out with the use of signals from the wheel revolution sensors 15. A diode 42 absorbs the surge current which will damage the transistor 41. A circuit block 40 is a timer circuit for detecting the time period when the skid control valve activating signal, which reduces the damping pressure, is generated. When the skid control valve activating signal is erroneously generated for a time period longer than the time period which is determined by a combination of a resistor 43, a capacitor 46 and the threshold value of a Zener diode 45, the voltage value appearing across a resistor 47 increases and hence a transistor 12 becomes in a conductive condition. A diode 44 is provided for immediately discharging the capacitor 46 upon termination of the generation of the skid control valve activating signal, whereby the capacitor 46 is prevented from being erroneously charged up by an intermittently generated skid control valve activating signal which is repeatedly generated in an intermittent fashion when the skid control system is in a normal operative condition. The collector of the transistor 12 is connected with the power supply wire 50 via resistors 11 and 13 whereas the emitter is connected with the ground potential.

A relay 23 in the fault indication unit 2 is associated with a select switch including a normally closed contact 23-$\bar{1}$, which connects the power supply wire 50 with the power supply source B, and a normally open contact 23-1, which connects an alarm lamp 24 with the power supply source B. A transistor 22, the collector of which is connected with the ground potential via the relay 23, is connected with the connection point provided between the resistors 11 and 13 at the base thereof through the fault detection signal transmission wire 51, the base being also connected with the ground potential via a resistor 21. The emitter of the transistor 22 is connected with a common terminal of the select switch having the normally closed contact 23-$\bar{1}$ and the normally open contact 23-1, the common terminal being connected with the power supply source B via the switch S.

When the resistance values of the resistors 11, 13 and 21 are selected to satisfy the relation that the resistance values 11, 13, are much less than the resistance value 21, the transistor 22 is OFF in the normal state since the transistor 12 is OFF in the normal condition. Therefore, the power supply wire 50 is connected with the power supply source B via the normally closed contact 23-$\bar{1}$ to supply the fault detection unit 1 with the electric power.

When some troubles occur within the skid control system, the transistor 12 becomes ON and hence the transistor 22 becomes ON since the base voltage of the transistor 22 reduces by the voltage reduction through the resistor 11. The relay 23 is activated and the power supply to the control circuit is terminated whereas the alarm lamp 24 is enabled since the normally closed contact 23-$\bar{1}$ is opened whereas the normally open contact 23-1 is closed. The base current of the transistor 22 flows through the emitter → the base → the resistor 21 since the resistor 11, which is interposed between the base and the emitter of the transistor 22 in the normal state, is in an open-circuit condition. Therefore, the transistor 22 is maintained in ON regardless of the condition of the transistor 12, and hence the alarm lamp 24 is continuously enabled till the switch S is opened.

When the power supply wire 50 and/or the fault detection signal transmission wire 51 is accidentally broken, the base current of the transistor 22 flows through the emitter → the base → the resistor 21 as is described above. The transistor 22 becomes ON and hence the relay 23 is activated to enable the alarm lamp 24. The same situation will occur when the connector 52 is erroneously disconnected.

Figure 3:
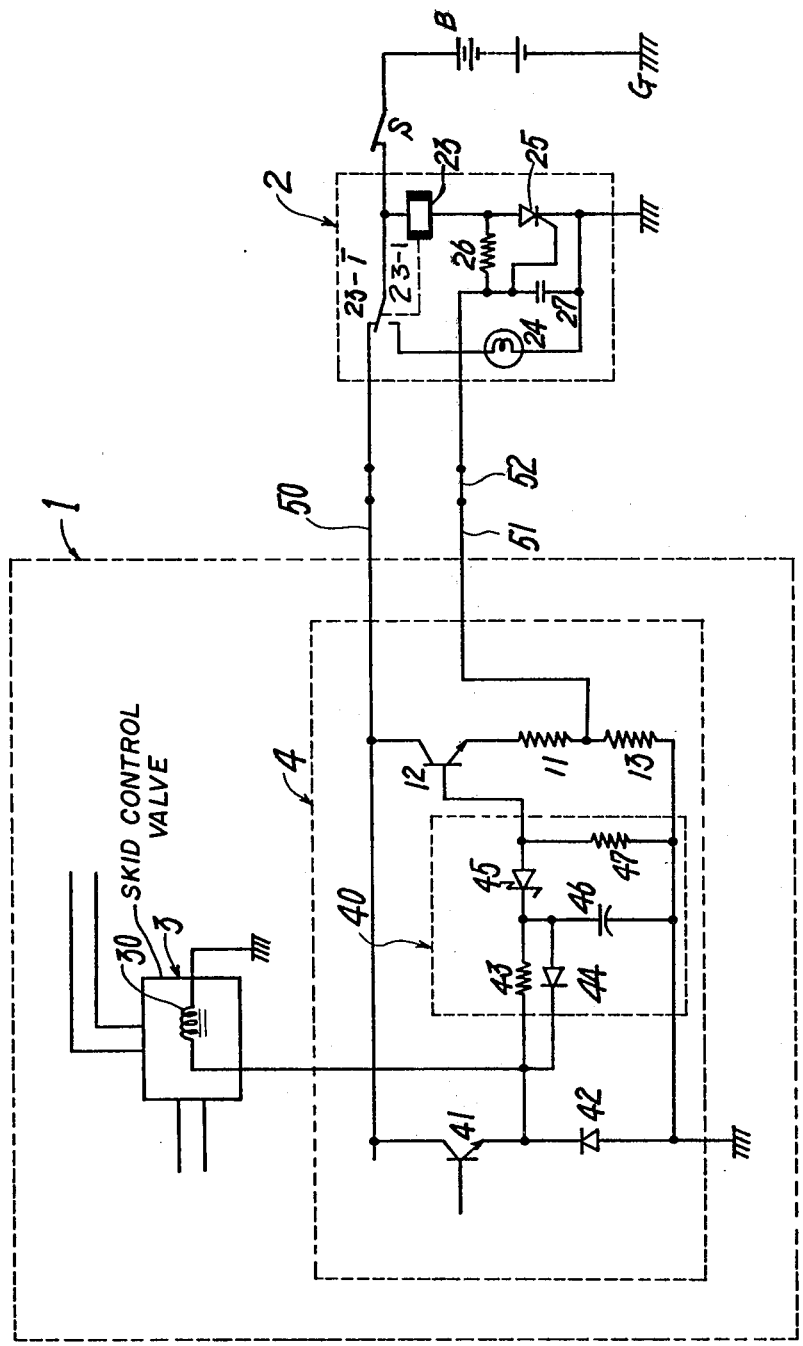
FIG. 3 is a circuit diagram showing another embodiment of the present invention.

Referring now to FIG. 3, showing another embodiment of the present invention, wherein like elements corresponding to those of FIG. 2 are indicated by like numerals.

The collector of the transistor 12 within the fault detection unit is connected with the power supply wire 50 whereas the emitter thereof is connected to the ground potential via the resistors 11 and 13. The fault detection signal transmission wire 51 is connected with the connecting point between the resistors 11 and 13, the point being at the ground potential in the normal state whereas it is at a predetermined high level when the skid control system is in a fault condition.

The gate of a SCR 25 is connected with the fault detection signal transmission wire 51, the positive electrode of the SCR 25 is connected with the common terminal of the select switch including the normally open contact 23-1 and the normally closed contact 23-$\bar{1}$ via the relay 23, and the negative electrode of the SCR 25 is connected with the ground potential. A resistor 26 is interposed between the positive electrode and the gate of the SCR 25. The relay 23 is associated with the select switch including the normally closed contact 23-$\bar{1}$, which connects the power supply wire 50 with the power supply source B, and the normally open contact 23-1, which connects the alarm lamp 24 with the power supply source B. The resistance values of the resistors 11 and 26 are selected to satisfy the relation that the resistance value 11 is much less than the resistance value 26.

When the skid control system is in a normally operative condition, the point provided between the resistors 11 and 13 is maintained at a ground potential and hence the SCR 25 is OFF. The relay 23 is not activated, and therefore, the normally closed contact 23-$\bar{1}$ is maintained in the closed condition. When some troubles occur within the skid control system, the transistor 12 becomes ON and the potential at the point between the resistors 11 and 13 increases to a predetermined level. The SCR 25 is triggered and becomes ON, and therefore, the relay 23 is activated to open the normally closed contact 23-$\bar{1}$ and close the normally open contact 23-1, whereby the alarm lamp 24 is enabled.

When the fault detection signal transmission wire 51 is accidentally broken, an electric current flows to the gate of the SCR 25 through the winding of the relay 23 and the resistor 26. The SCR 25 is triggered by the electric current, and therefore, the relay 23 is activated to close the normally open contact 23-1, whereby the alarm lamp 24 is enabled. A capacitor 27 is interposed between the gate and the negative electrode of the SCR 25 to prevent the SCR 25 from being triggered by noise. It will be clear that the alarm lamp 24 is also enabled when the connector 52 is erroneously disconnected.

Although in the embodiment of FIG. 3 the SCR 25 is provided for activating the relay 23, and NPN type transistor can be provided to activate the relay 23.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an alarm system for indicating a fault condition of an anti-skid braking control system wherein a fault detection unit which is activated only upon detection of a fault in the anti-skid braking control system and a fault indication unit are spaced away from each other, said system also having a fault detection signal transmission wire connecting the fault detection unit to the fault indication unit and which carries current from said fault detection unit to said fault indication unit only when the former unit is in an activated state, said system further having a power supply wire connecting the fault indication unit to the fault detection unit, the improvement comprising:
   a fault indication driving circuit provided within the fault indication unit which is so connected that normally it is in a blocked condition permitting no current flow therethrough; and
   a bias voltage generating means for biasing the fault indication driving circuit into a conducting state when a break occurs in the power supply wire or the signal transmission wire, thereby permitting current flow through the driving circuit and consequent activation of the fault indication unit.

2. In an alarm system for indicating a fault condition of an anti-skid braking control system wherein a fault detection unit which is activated only upon detection of a fault in the anti-skid braking control system and a fault indication unit are spaced away from each other, said system also having a fault detection signal transmission wire connecting the fault detection unit to the fault indication unit and which carries current from said fault detection unit to said fault indication unit only when the former unit is in an activated state, said system further having a power supply wire connecting the fault indication unit to the fault detection unit, the improvement comprising:
   a power source;
   an alarm means provided within the fault indication unit;
   a switching means provided within the fault indication unit for selectively connecting the alarm means or the power supply wire with the power source, said switching means being normally arranged to connect the power supply wire with the power source;
   an activating means provided within the fault indication unit having a bias voltage input connected with the fault detection signal transmission wire, said activating means being arranged to selectively switch the switching means upon current flow therethrough and normally connected so that it is in a blocked condition permitting no current flow therethrough; and a bias voltage generating means for biasing the activation means into a conducting state when a break occurs in the power supply wire or the signal transmission wire, thereby causing current flow therethrough with consequent selective switching of the switching means to connect the power supply to the alarm means with consequent enablement thereof.

3. In an alarm system for indicating a fault condition of an anti-skid braking control system wherein a fault detection unit which is activated only upon detection of a fault in the anti-skid braking control system and a fault indication unit are spaced away from each other, said system also having a fault detection signal transmission wire connecting the fault detection unit to the fault indication unit and which carries current from said fault detection unit to said fault indication unit only when the former unit is in an activated state, said system further having a power supply wire connecting the fault indication unit to the fault detection unit, the improvement comprising:
   a power source;
   an alarm means provided within the fault indication unit;
   a switching means provided within the fault indication unit for selectively connecting the alarm means or the power supply wire with the power source, said switching means being normally arranged to connect the power supply wire with the power source;
   a three-pole electronic device provided within the fault indication unit arranged to permit current flow between two of the poles which is controlled by the voltage applied to the third pole, said electronic device being connected so as to cause selective switching of the switching means upon current flow therethrough, and normally connected so that it is in a blocked condition permitting no current flow therethrough; and
   a bias voltage generating means for biasing the three-pole electronic device into a conducting state when a break occurs in the power supply wire or the signal transmission wire, thereby causing current flow therethrough with consequent selective switching of the switching means to connect the power supply to the alarm means with consequent enablement thereof.

4. The alarm system of claim 3 in which the three-pole electronic device is a transistor.

5. The alarm system of claim 4 in which the transistor has its base connected to the signal transmission wire.

6. The alarm system of claim 3 in which the three-pole electronic device is a silicon-controlled rectifier.

7. The alarm system of claim 6 in which the silicon-controlled rectifier has its gate connected to the signal transmission wire.

* * * * *